(12) United States Patent
Gebhardt et al.

(10) Patent No.: US 10,461,610 B2
(45) Date of Patent: Oct. 29, 2019

(54) ELECTRICALLY-CONDUCTIVE CONNECTION DEVICE FOR USE IN A COMPACT MINIATURIZED MOTOR ASSEMBLY

(71) Applicant: Molon Motor and Coil Corporation, Arlington Heights, IL (US)

(72) Inventors: Larry Gebhardt, Saint Charles, IL (US); Emilio A. Ramirez, Jr., Roselle, IL (US)

(73) Assignee: MOLON MOTOR & COIL CORPORATION, Arlington Heights, IL (US)

( * ) Notice: Subject to any disclaimer, the term of this patent is extended or adjusted under 35 U.S.C. 154(b) by 320 days.

(21) Appl. No.: 15/614,304

(22) Filed: Jun. 5, 2017

(65) Prior Publication Data

US 2017/0353086 A1 Dec. 7, 2017

Related U.S. Application Data

(60) Provisional application No. 62/345,058, filed on Jun. 3, 2016.

(51) Int. Cl.
   *H02K 11/33* (2016.01)
   *H02K 23/04* (2006.01)
   *H01R 13/207* (2006.01)
   *H01R 39/36* (2006.01)
   *H01R 12/51* (2011.01)

(52) U.S. Cl.
   CPC ........... *H02K 11/33* (2016.01); *H01R 13/207* (2013.01); *H01R 39/36* (2013.01); *H02K 23/04* (2013.01); *H01R 12/515* (2013.01)

(58) Field of Classification Search
   CPC ...................................................... H02K 11/33
   See application file for complete search history.

(56) References Cited

U.S. PATENT DOCUMENTS

| | | |
|---|---|---|
| 9,169,833 B2 | 10/2015 | McCormick et al. |
| 10,003,235 B2 * | 6/2018 | Hernandez ............. H02K 5/225 |
| 2014/0225482 A1 * | 8/2014 | Hara ........................ H02K 5/22 310/68 D |

(Continued)

*Primary Examiner* — Robert W Horn
(74) *Attorney, Agent, or Firm* — Oliff PLC; R. Brian Drozd

(57) ABSTRACT

The present disclosure relates to miniaturized motor assembly for use in an appliance, for example, an ice maker for a commercial or residential refrigerator. The miniaturized motor assembly includes an electric motor, such as a permanent magnet direct current (PMDC) motor, and a printed circuit board operable to control power to the electric motor, wherein the printed circuit board is connected to the motor as a component of the assembly. At least one electrically-conductive connection device acts as a terminal, providing multiple points of contact between the printed circuit board and the motor, forming both an improved, reliable mechanical connection and an effective electrical connection between the circuit board and the motor. Use of the electrically-conductive connection device of the present disclosure eliminates the need for tedious and inconsistent soldering connections, while providing multiple points of contact and improved electrical contact over other forms of connecting devices.

20 Claims, 4 Drawing Sheets

(56) References Cited

U.S. PATENT DOCUMENTS

| | | | | |
|---|---|---|---|---|
| 2014/0339966 A1* | 11/2014 | Tomizawa | ............... | H02K 5/22 |
| | | | | 310/68 D |
| 2015/0123501 A1* | 5/2015 | Jang | ........................ | H02K 5/08 |
| | | | | 310/43 |
| 2016/0036302 A1* | 2/2016 | Stauffer | ............... | H05K 1/0256 |
| | | | | 310/68 D |
| 2016/0037659 A1* | 2/2016 | Yamanaka | ........... | H05K 5/0026 |
| | | | | 310/68 R |
| 2016/0156246 A1* | 6/2016 | Hotori | .................... | H02K 5/225 |
| | | | | 310/43 |
| 2016/0336831 A1* | 11/2016 | Horizumi | ................. | H02K 5/10 |
| 2017/0302139 A1* | 10/2017 | Sakai | ...................... | F04B 39/00 |
| 2017/0353086 A1* | 12/2017 | Gebhardt | ............... | H02K 11/33 |
| 2017/0366073 A1* | 12/2017 | Hieda | .................... | H02K 11/33 |
| 2018/0245597 A1* | 8/2018 | Takarai | ..................... | H02K 3/52 |
| 2018/0270994 A1* | 9/2018 | Wang | ................. | H05K 7/20981 |
| 2018/0309340 A1* | 10/2018 | Ogawa | ..................... | H02K 3/50 |
| 2018/0351472 A1* | 12/2018 | Dib | ......................... | H02M 1/34 |
| 2019/0006907 A1* | 1/2019 | Li | .......................... | F04D 25/06 |
| 2019/0028004 A1* | 1/2019 | Hamada | ................. | H01R 13/04 |
| 2019/0081530 A1* | 3/2019 | Fukuzawa | ............... | H02K 5/20 |
| 2019/0115806 A1* | 4/2019 | Yamashita | ............. | H01L 23/40 |
| 2019/0123621 A1* | 4/2019 | Higashide | ............. | H02K 11/33 |

* cited by examiner

ELECTRICALLY-CONDUCTIVE CONNECTION DEVICE FOR USE IN A COMPACT MINIATURIZED MOTOR ASSEMBLY

This application claims priority to U.S. Provisional Application Ser. No. 62/345,058 filed Jun. 3, 2016, which is incorporated in its entirety herein.

TECHNICAL FIELD

The present disclosure relates generally to a miniaturized motor assembly. In particular, the present disclosure relates to a miniaturized motor assembly including a permanent magnet direct current (PMDC) motor secured to a printed circuit board (PCB) using an electrically conductive connection device. The present electrically conductive connection device provides multiple points of contact between the motor and the PCB, offering both improved electrical and mechanical integrity between the PCB and the motor. The present device is useful for designing a miniaturized motor assembly required in limited spaces, such as in the interior of appliances.

BACKGROUND

It is, of course, generally known to create a motor assembly using an electric motor, such as a permanent magnet direct current (PMDC) motor connected to a printed circuit board (PCB) for generating power to the motor. In particular, miniaturized motor assemblies are useful in many forms of both commercial and household appliances, including, but not limited to, ice makers, automatic dishwashing machines, laundry machines, vending machines and other appliances.

The conventional approach of attaching a printed circuit board to a preferred motor, while maintaining the desired electrical connection, is by soldering. The issue, however, is that soldering is a difficult process, requiring expert technique. Further, soldering can be a slow and inconsistent process, as accuracy is dependent on the skill of the person performing the soldering work. Additionally, soldering itself results in fumes which can be unpleasant for those performing the soldering.

Other types of fasteners may also be used to connect a PCB to a motor, including screws optionally constructed from electrically conductive material. However, the screws may not provide the close, compact arrangement between the PCB and the motor due to the shank structure of the screw, or offer the improved mechanical and electrical connection proposed by the multi-point contacts of the present device.

A need, therefore, exists for an improved device and method for securing a printed circuit board to a desired motor to create a compact miniaturized motor assembly. Specifically, a need exists for an improved device and method for securing a printed circuit board to a motor without soldering as the primary connection, as well as provide consistent electrical and mechanical connections.

A need further exists for an improved device and method for securing a printed circuit board to a motor to create a compact arrangement for a miniaturized motor assembly.

Moreover, a need exists for an improved device and method for securing a printed circuit board to a motor creating at least one improved electrical connection through multiple points of contact between the PCB and the motor.

Further, a need exists for an improved device and method for creating an improved mechanical connection through multiple points of contact between the PCB and the motor.

A need further exists for an improved device and method providing an easier, faster and more consistent connection between a PCB and a motor.

Further, a need exists for an improved device and method for providing repeatable electrical connections between a PCB and a motor for use in constructing a miniaturized motor assembly.

SUMMARY

The present invention relates to miniaturized motor assembly for use in an appliance, for example, a washing machine, dishwasher or an ice maker for a commercial or residential refrigerator. The miniaturized motor assembly includes an electric motor, such as a permanent magnet direct current (PMDC) motor, and a printed circuit board operable to control power to the electric motor, wherein the printed circuit board is connected to the motor as a component of the assembly. At least one electrically-conductive connection device acts as a terminal, providing multiple points of contact between the printed circuit board and the motor, forming both an improved, reliable mechanical connection and an effective electrical connection between the circuit board and the motor. Use of the type electrically-conductive connection device of the present disclosure eliminates the need for tedious and inconsistent soldering connections, while providing multiple points of contact and improved electrical contact over other forms of connecting devices. Additionally, use of the present connection device simplifies assembly of the overall miniaturized motor assembly.

To this end, in an embodiment of the present disclosure, a motor assembly is provided. The motor assembly includes a motor having an end component, a printed circuit board configured to operate the motor, at least one electrically-conductive connection device for securing the printed circuit board to the end component of the motor, the connection device comprising: a first side and a second side, wherein the first side and the second side connect to one another along an outer edge, wherein the first side and the second side are positioned perpendicular to one another, the first side further including a threaded aperture, wherein the threaded aperture is designed for receiving a fastener there through; and, wherein the connection device provides multiple points of electrical and mechanical contacts between the motor and the printed circuit board.

In yet another embodiment, a compact miniaturized motor assembly is provided. The compact miniaturized motor assembly includes a motor with an end having an outer surface and a center shaft projecting therefrom, a printed circuit board configured to operate the motor, a first electrically-conductive connection device and a second electrically-conductive connection device, each connection device for securing the printed circuit board to the end surface of the motor, each connection device comprising: a first side and a second side, wherein the first side and the second side connect to one another along an outer edge, wherein the sides are positioned perpendicular to one another, the first side further includes a threaded aperture, wherein the threaded aperture is designed for receiving a fastener; and, wherein the connection devices provide multiple points of electrical and mechanical contacts between the motor and the printed circuit board.

An improved method for securing a printed circuit board to a motor creating a miniature motor assembly is also provided. The method includes the steps of providing a motor having an end and a center shaft projecting therefrom, providing a printed circuit board configured to operate the motor, positioning a first electrically-conductive connection device and a second electrically-conductive connection device onto the end of the motor and offset from each other, each connection device comprising: a first side and a second side, wherein the first side and the second side connect to one another along an outer edge, wherein the sides are positioned perpendicular to one another, the first side further includes a threaded aperture, wherein the threaded aperture is designed for receiving a fastener for securing the printed circuit board to the motor, and, securing the printed circuit board to the end of the motor using the first and second connection devices, wherein the connection devices provide multiple points of electrical and mechanical contacts between the motor and the printed circuit board.

It is, therefore, an advantage and objective of the present disclosure to provide motor assembly, including a compact miniaturized motor assembly having an improved connection device for securing a printed circuit board to a motor without soldering.

Moreover, it is an advantage and objective of the present disclosure to provide a electrically-conductive connection device for securing a printed circuit board to a motor while providing an improved mechanical connection.

It is yet another advantage and objective of the present disclosure to provide an electrically-conductive connection device for securing a printed circuit board to a motor that also provides multiple contact points for improved mechanical and electrical connection between the printed circuit board and the motor.

It is yet a further advantage and objective of the present disclosure to provide an electrically-conductive connection device that provides easier, faster and more consistent connections between a printed circuit board and a motor.

It is another advantage and objective of the present disclosure to provide a method for securing a printed circuit board to a motor using an electrically-conductive connection device, thereby providing both an improved electrical and mechanical connection between the printed circuit board and the motor.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present invention relates to a miniaturized motor assembly 10 for use primarily in appliances, for example, refrigerator ice making machines, dishwashing machines, laundry machines, and other household and commercial appliances. All of these appliances typically have limited interior space; thus, it is advantageous to use a compact, miniaturized motor assembly in the operation of these appliances. The present invention provides a connection device for not only efficiently and easily connecting a printed circuit board (PCB) to a permanent magnet DC (PMDC) motor, but also provides at least one, and preferably multiple electrical contact points between the PCB and the PMDC motor, thereby offering an improved electrical connection. Additionally, the multiple contact points offered by the present terminal tab connection device also provide an improved mechanical connection between the PCB and its PMDC motor.

Figure 1:
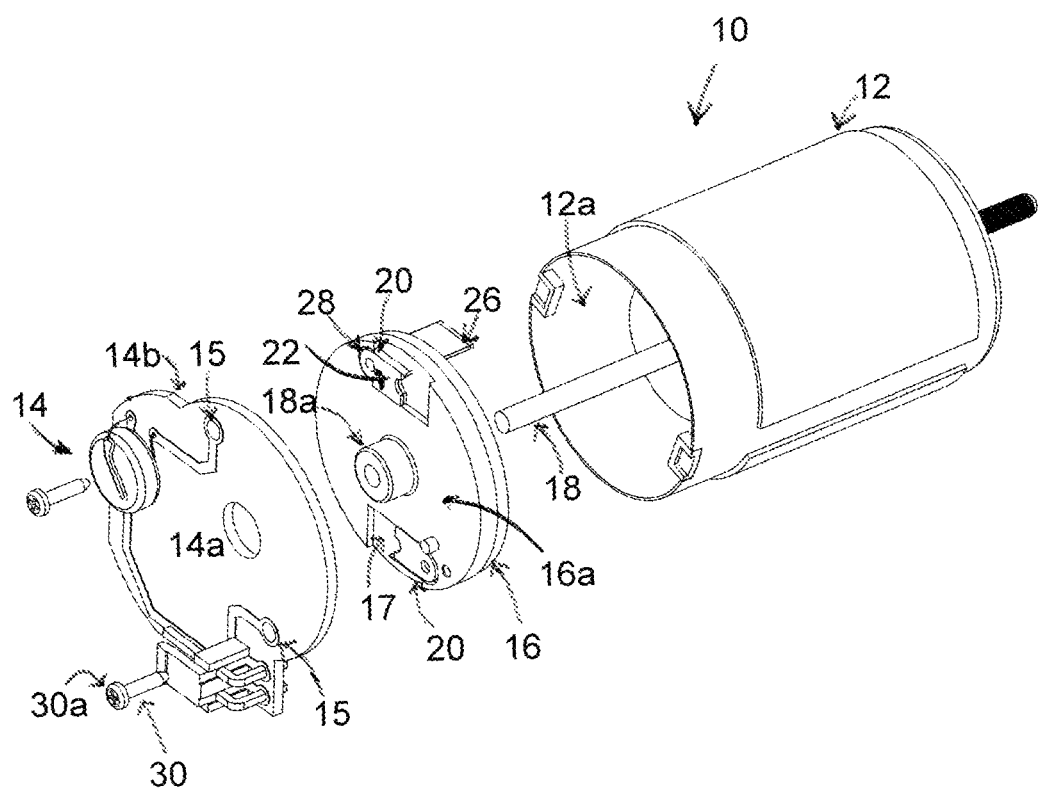
FIG. 1 illustrates an exploded view of a miniaturized motor assembly in accordance with the present disclosure.

Now referring to the figures, wherein like numerals refer to like parts, FIG. 1 illustrates an exploded view of an exemplary embodiment of a motor assembly 10, including a miniaturized motor assembly for use in the operation of an appliance or component of an appliance, such as an icemaker for a refrigerator. Specifically, the present miniaturized motor assembly 10 is useful in appliances having limited internal space, including ice makers, refrigerators, automatic dishwashers, and the like. The miniaturized motor assembly 10 typically includes a direct current motor 12, which is connected to a printed circuit board (PCB) 14.

Direct current (DC) motors are well-known and commonly-used motors for operating small machine/appliance applications, such as a washing machine, and/or appliance components, such as an icemaker in a refrigerator. Additionally, because of the limited interior space of most appliances for its motor and other operating features, it is advantageous to have a compact motor assembly. In the present disclosure, a permanent magnet direct current (PMDC) motor 12 is used. The present motor 12 also shows a shaft 18; however, other known components of the motor, including a rotor, stator (or armature), brushes, and a plurality of magnets/windings, etc., are not shown. The motor 12 of the present assembly includes an end component 16, preferably constructed from plastic, having an outer surface 16a for securing a printed circuit board 14 thereto using the connection device 20 of the present disclosure.

FIG. 1 illustrates a typical printed circuit board (PCB) 14 used for operation of the motor 12 in the present assembly 10. The PCB is of an exemplary type, as is known in the art. The conventional approach of attaching a PCB to a motor is by soldering. However, soldering the PCB 14 to the motor 12 can be not only tedious, but inaccurate, often resulting in an unsatisfactory mechanical and electrical connections between the PCB and the motor. Furthermore, accurate soldering takes skill and is time-consuming.

The present disclosure, however, provides an improved connection device 20, generally in the form of a tab, for securing the PCB 14 to the motor 12. The shape of the present connection device 20, which may also be referred to as a terminal tab connection device, further provides multiple points of contact resulting improved electrical and mechanical contact between the printed circuit board 14 and the motor 12. The terminal tab connection device 20 provides a direct contact point between the PCB and the motor terminals holding the brush mechanism (not shown) of the motor, which provides improved electrical connection.

Figure 4:
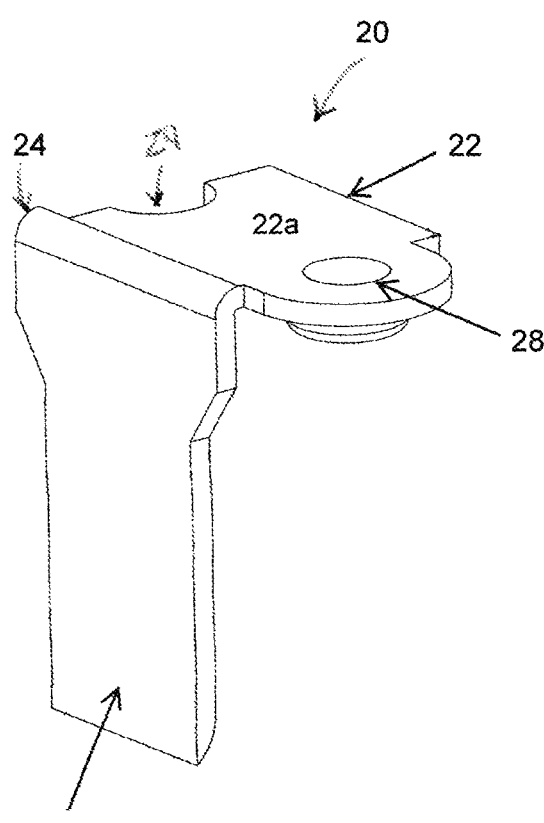

As shown in FIGS. 1 and 4, the connection device 20 of the present disclosure has a generally L-shaped configuration. Specifically, the connection device 20 includes a first terminal side 22 connected by an edge 24 to a second side 26, wherein the first side and the second side are positioned at a 90 degree angle or perpendicular to one another. The first terminal side 22, which acts as a screw terminal, includes a threaded opening or aperture 28 there through. A second, semicircle shaped opening 29 may also be included on the first terminal side 22 and opposite to the aperture 28. The second, semicircle opening 29 may accommodate a second fastener, as needed.

Figure 2:
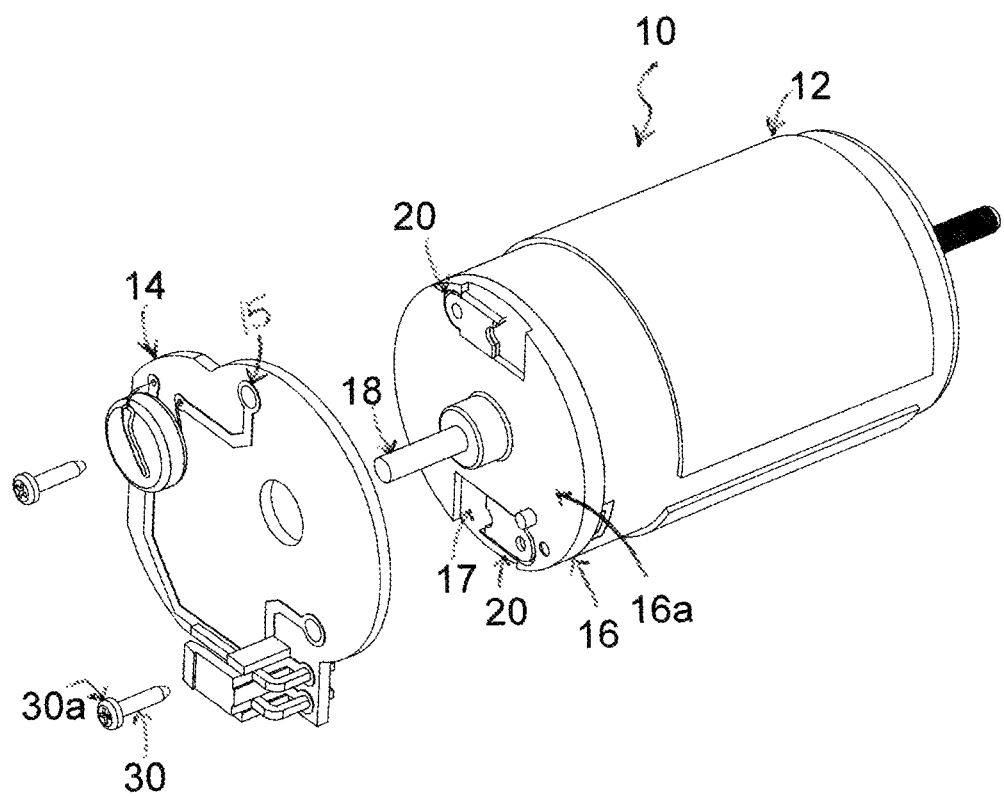
FIG. 2 illustrates a partially exploded view of the miniaturized motor assembly in accordance with the present disclosure.

The threaded aperture 28 is designed to receive a securing element or fastener, such as a screw 30 for connecting the PCB 14 to the motor 12 (FIGS. 1 and 2). The surface 22a of the first side 22 provides a point of contact at a solder pad 15 shown on the outer side or component side 14a of the PCB on the inner side 14b of the PCB, which connects with the first terminal side 22. Thus, the surface 22a of the first side 22 of the connection device 20, the threaded aperture 28, the screw 30 engaged within the threaded aperture, and the screw head 30a are all points of contact, providing improved, multiple points of electrical and mechanical contact between the PCB 14 and the motor 12.

Figure 3:
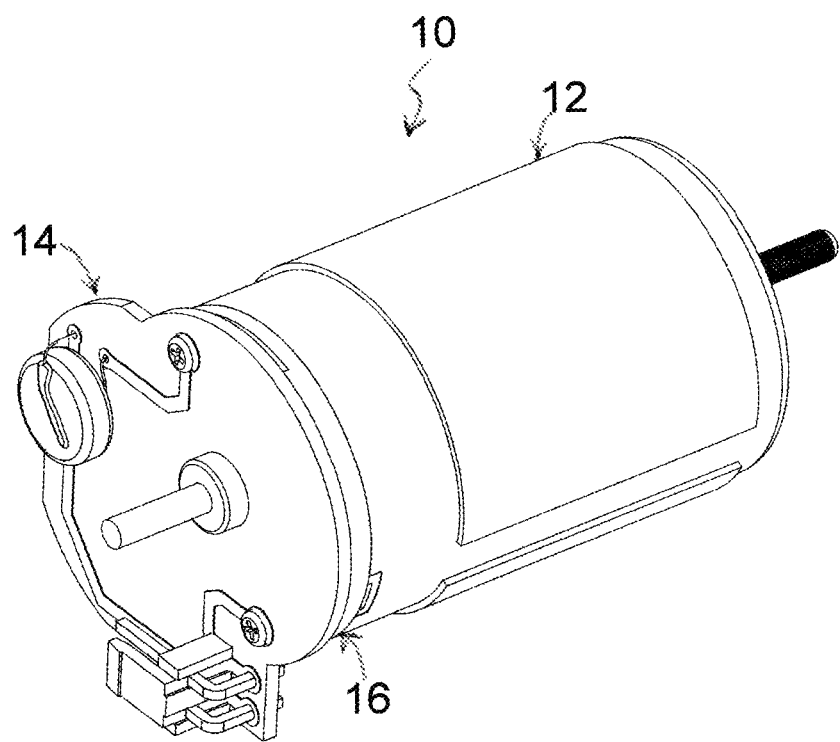
FIG. 3 illustrates a perspective view of the completely assembled miniaturized motor assembly of the present disclosure; and, FIG. 4 illustrates a perspective view of an electrically-conductive connection device for use in a miniaturized motor assembly of the present disclosure.

Additionally, when the terminal tab connection device 20 is positioned on the end component 16, specifically on the end surface 16a of the motor 12, the second side 26 of the terminal tab connection device 20 extends through the end surface and into the interior 12a of the motor. When positioned, the second side 26 of the connection device 20 contacts the brush holder (not shown), which houses the brush mechanism, which in turn contacts the armature assembly (not shown) of the motor 12. The entire terminal tab connection device 20 (one negative terminal and one positive terminal) is fitted into the plastic end component 16 of the motor 12 (FIGS. 2 and 3). The end component 16 provides not only a mechanical connection between the PCB and the motor, but more importantly, insulates the two voltage potential (negative and positive terminals) from shorting as electrical voltage is introduced to the terminals 20 via the PCB 14 providing power to the motor 12.

In an embodiment of the present disclosure, at least one electrically-conductive connection device 20 is used to connect the PCB 14 to the motor 12. In a preferred embodiment of the present disclosure, the assembly 10 includes at least two electrically-conductive connection devices 20. As shown in FIGS. 1 and 2, the connection devices 20 are separately embedded within an end component 16 of the motor 12, specifically within a slight indentation space 17 on the outer surface 16a of the end component. When the first terminal side 22 of the connection device 20 is placed within the indentation space 17, the second side 26 of the connection device is inserted into an opening (not shown) in the end component 16, such that the second side projects into the interior 12a of the motor 12. In this manner, when positioned, the first terminal side 22 of the connection devices 20 flush with the outer surface 16a of the end component 16 of the motor 12. Thus, when the printed circuit board 14 is secured to motor 12, the printed circuit board solder pad 15 is positioned directly on top of the first terminal side 22 thus making a direct contact. When the screw 30 is inserted into the threaded aperture 28 and tightened, a very efficient electrical connection between the PCB 14 through its copper solder pad 15 and the first terminal side 22 occurs. This arrangement results in the improved multiple point electrical and mechanical contacts between the printed circuit board 14 and the motor 12.

As shown in FIGS. 1 and 2, in a preferred embodiment, the terminal tab connection devices 20 are designed to be positioned offset from one another and also off-center from the center axis opening 18a for the motor shaft 18 on the end component 16 of the motor 12. A printed circuit board 14 is typically attached to a motor using fasteners, such as screws placed in holes (not shown) on either side of the center motor shaft 18. In the present disclosure, the connection devices 20 are positioned diagonally opposed from one another, and off-center to the center axis opening 18a for the motor shaft 18. The motor screws 30 used to connect the PCB 14 to the end component 16 of the motor 12 through the connection devices 20, are also off-center from the motor shaft 18. This offset arrangement of the connection devices 20 and the motor screws 30 enhances the mechanical strength of the arrangement, including better structural holding force and structural integrity to PCB 14 in relation to its plane and the motor 12.

Advantages offered by the present electrically-conductive connection device 20 in the miniaturized compact motor assembly 10 include: repeatable, consistent and reliable electrical connections, which are easier to apply and less hazardous than solder joints and connections. The present electrically-conductive connection device 20 also provides multiple contact points between the PCB and motor, providing improved electrical and mechanical connections between the PCB and motor.

An improved method for securing a printed circuit board 14 to a motor 12 creating a miniature motor assembly 10, is also provided. The method provides multiple points of electrical and mechanical contacts between a motor and a printed circuit board. The method includes the steps of providing a motor 12 having an end 16 and a center shaft 18 projecting therefrom, providing a printed circuit board 14 configured to operate the motor. At least a first electrically-conductive connection device 20 and a second electrically-conductive connection device 20 are secured to the end 16 of the motor 12 and offset from each other. The electrically-conductive connection devices 20 each include a threaded aperture 28, wherein the threaded aperture is designed for receiving a fastener 30 for securing the printed circuit board 14 to the motor 12. Securing the printed circuit board 14 to the end 16 of the motor 12 using the first and second connection devices 20, provide multiple points of electrical and mechanical contacts between the motor and the printed circuit board. Advantages of the present method includes providing improved, reliable and repeatable electrical and mechanical connections between the printed circuit board 14 and motor 12 without the need for soldering.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

We claim:

1. A motor assembly comprising:
a motor having an end component;
a printed circuit board configured to operate the motor;

at least one electrically-conductive connection device for securing the printed circuit board to the end component of the motor, the connection device comprising:
  a first side and a second side, wherein the first side and the second side connect to one another along an outer edge, wherein the first side and the second side are positioned perpendicular to one another;
  the first side further including a threaded aperture, wherein the threaded aperture is designed for receiving a fastener there through for connecting the printed circuit board to the motor; and,
  wherein the connection device provides multiple points of electrical and mechanical contacts between the motor and the printed circuit board.

2. The motor assembly of claim 1, wherein the motor is a permanent magnet DC motor.

3. The motor assembly of claim 1, wherein components of the motor include at least a center shaft extending from an interior of the motor outward from the end component of the motor.

4. The motor assembly of claim 1, wherein the fastener is an electrically-conductive screw.

5. The motor assembly of claim 1, wherein the end component of the motor includes a outer surface having at least one indentation therein.

6. The motor assembly of claim 5, wherein the indentation is adapted for receiving the connection device.

7. The motor assembly of claim 6, wherein the connection device is flush with the outer surface when the connection device is positioned within the indentation.

8. The motor assembly of claim 7, wherein the first side of the connection device is flush with the outer surface of the end component motor and the second side projects through the end component and into an opposing interior of the motor.

9. The motor assembly of claim 8, wherein the second side of the connection device extends into the interior of the motor for connection with the brush mechanism of the motor.

10. The motor assembly of claim 1, wherein the connection device is positioned off-center from a center axis of the end component of the motor.

11. The motor assembly of claim 1, wherein the assembly includes at least a first connection device and a second connection device, wherein the connection devices are positioned diagonally opposing each other on the end component.

12. The motor assembly of claim 11, wherein the first connection and second connection device are positioned off-center from a center axis of the motor.

13. The motor assembly of claim 11, wherein each connection device includes an aperture adapted for receiving a fastener.

14. The motor assembly of claim 13, wherein the fasteners are positioned diagonally opposing each other when the fasteners are received within the apertures of each of the first and second connection devices.

15. A compact miniaturized motor assembly comprising:
  a motor having an end with an outer surface and a center shaft projecting therefrom;
  a printed circuit board configured to operate the motor;
  a first electrically-conductive connection device and a second electrically-conductive connection device, each connection device for securing the printed circuit board to the outer surface of the motor, each connection device comprising:
    a first terminal side and a second side, wherein the first terminal side and the second side connect to one another along an outer edge, wherein the sides are positioned perpendicular to one another;
    the first terminal side further includes a threaded aperture, wherein the threaded aperture is designed for receiving a fastener for securing the printed circuit board to the motor; and,
    wherein the connection devices and the fastener provide multiple points of electrical and mechanical contacts between the motor and the printed circuit board.

16. The compact miniaturized motor assembly of claim 15, wherein the first electrically-conductive connection device is positioned diagonally opposed to the second electrically-conductive connection device on the end surface of the motor.

17. The compact miniaturized motor assembly of claim 16, wherein the first electrically-conductive connection device and the second electrically-conductive connection device are positioned off center from the center shaft of the motor.

18. The compact miniaturized motor assembly of claim 15, wherein the first side of each electrically-conductive fastener device is secured flush with the end surface of the motor, and the second side of each electrically-conductive fastener device projects through the end surface an into an interior space of the motor.

19. A method for providing multiple points of electrical and mechanical contacts between a motor and a printed circuit board, the method comprising the steps of:
  providing a motor having an end and a center shaft projecting therefrom;
  providing a printed circuit board configured to operate the motor;
  positioning a first electrically-conductive connection device and a second electrically-conductive connection device onto the end of the motor and offset from each other, each connection device comprising:
  a first side and a second side, wherein the first side and the second side connect to one another along an outer edge, wherein the sides are positioned perpendicular to one another;
  the first side further includes a threaded aperture, wherein the threaded aperture is designed for receiving a fastener for securing the printed circuit board to the motor; and,
  securing the printed circuit board to the end of the motor using the first and second connection devices, wherein the connection devices provide multiple points of electrical and mechanical contacts between the motor and the printed circuit board.

20. The method of claim 19, wherein the method further includes inserting a fastener into the threaded aperture for securing the printed circuit board directly to the motor, and providing at least one point of electrical and mechanical connection between the printed circuit board and the motor through the connection devices and the associated fasteners.

* * * * *